US008010970B2

(12) United States Patent
Birov et al.

(10) Patent No.: US 8,010,970 B2
(45) Date of Patent: Aug. 30, 2011

(54) DEVELOPING CONTROLS FOR OUTLOOK ADD-INS

(75) Inventors: Dimitar Birov, Sofia (BG); Michael W. Morton, Snohomish, WA (US); Daniel A. Molina, Redmond, WA (US); John Durant, Duvall, WA (US); Thomas E. Quinn, Seattle, WA (US); Michael Shneerson, Redmond, WA (US); David A. Whitechapel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1161 days.

(21) Appl. No.: 11/733,524

(22) Filed: Apr. 10, 2007

(65) Prior Publication Data

US 2008/0256555 A1   Oct. 16, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 719/315; 719/318
(58) Field of Classification Search .......... 719/315, 719/316, 318, 320
See application file for complete search history.

(56) References Cited

U.S. PATENT DOCUMENTS

| | | | |
|---|---|---|---|
| 6,085,030 A * | 7/2000 | Whitehead et al. .......... 709/203 |
| 6,243,721 B1 | 6/2001 | Duane et al. | |
| 6,263,492 B1 * | 7/2001 | Fraley et al. .................. 717/107 |
| 7,072,810 B2 | 7/2006 | Ramanathan et al. | |
| 2003/0236859 A1 * | 12/2003 | Vaschillo et al. ............. 709/218 |
| 2004/0093587 A1 * | 5/2004 | Sesma ........................... 717/118 |
| 2004/0095387 A1 | 5/2004 | Demsey et al. | |
| 2006/0004836 A1 | 1/2006 | Dhingra | |
| 2006/0004845 A1 | 1/2006 | Kristiansen et al. | |
| 2006/0173863 A1 | 8/2006 | Paulus et al. | |
| 2006/0177013 A1 | 8/2006 | Frifeldt et al. | |
| 2006/0282817 A1 | 12/2006 | Darst et al. | |

OTHER PUBLICATIONS

Microsoft Corp, Outlook Customization for Integrating with Enterprise Applications, Microsoft Corporation, Jan. 2006, pp. 1-17.*
Sys-Con Media, ActiveX Controls and .NET, .NET Developers Journal, 2004, pp. 1-11.*
Keserovic et al, An Overview of Managed/Unmanaged Code Interoperability, Microsoft Corporation, Oct. 2003, pp. 1-9.*
Adam Nathan, .NET and COM: The Complete Interoperability Guide, Sams Publishing, 2002, chapter 2, section "How Unmanaged Code Interacts with Managed Code", pp. 1-24.*
Esposito, Hosting .NET Applications in the Browser, Dr. Dobb's, Feb. 2003, pp. 1-5.*
Barnett, Bryan et al., "An Architecture for Distributed Applications on the Internet: Overview of the Microsoft.NET Framework," Microsoft Corporation, Jan.-Jun. 2003 (7 pages).
Visual Studio Tools for the Microsoft Office System, Walkthrough: Creating an Outlook Form Region, Copyright 2007 Microsoft Corporation (15 pages).

* cited by examiner

*Primary Examiner* — Diem Cao
(74) *Attorney, Agent, or Firm* — Perkins Coie LLP (57) ABSTRACT

The forms hosting system allows a developer to design custom Outlook form regions containing standard and custom managed controls using popular development tools. The forms hosting system provides a runtime wrapper that appears to Outlook as a normal ActiveX control. When Outlook invokes the runtime wrapper control, the runtime wrapper control loads the managed controls defined by the developer. The runtime wrapper control translates messages received from Outlook into messages understood by the managed controls.

18 Claims, 5 Drawing Sheets

DEVELOPING CONTROLS FOR OUTLOOK ADD-INS

BACKGROUND

Developers of many application programs ("applications") implement the applications so that they can be customized by third parties. To customize an application, a third party develops custom code (e.g., add-ins and document-level customizations) that uses functionality exposed by the application. The custom code may improve the usability of the applications or provide additional functionality (e.g., domain-specific functionality). Such applications are referred to as "host applications" because the custom code is hosted within the process of the application. Developers of applications typically want to encourage the development of custom code for their applications to increase the demand for their applications. As a result, such developers may provide "runtimes" that facilitate the development of custom code. A runtime is code that is loaded along with custom code and provides services to the custom code. These services may include higher-level functionality than exposed by the application or may include domain-specific functionality. When an application is to load and start the execution of custom code, the application may load the runtime and direct the runtime to load and start the execution of the custom code.

Because of the ease of developing custom code as "managed code," many applications support the execution of custom code in the .NET Framework provided by Microsoft Corporation. The .NET Framework provides a common language runtime ("CLR") that provides high-level operating system type services to the managed programs (including custom code and applications) and serves as an execution engine for managed programs. The CLR ensures that managed programs do not take any unauthorized action. As such, the CLR acts as a "sandbox" within which managed programs execute. The CLR provides application domains ("appdomains") in which different managed programs can execute to help ensure that an errant managed program will not unduly affect the execution of another managed program.

Forms allow developers to create new types of email messages to add to the existing mail, calendar, note, and other types of email messages built into an email application. Forms may include user interface elements, such as buttons, text boxes, and so forth, as well as executable code that define the behavior of the form, such as what actions to take when a user clicks a button. Microsoft Office Outlook 2007 introduced a new form technology called form regions. Form regions overcome the limitations of customizing Outlook forms by using form pages in a variety of new ways. For example, form regions can be displayed in the Reading Pane, and can be added to standard forms without creating a derived message class. The older forms framework only allowed executable code to be provided through a scripting language. The new form regions allow developers to write code for a form using managed code (e.g., using .NET) or other Component Object Model (COM)-based languages. In previous versions of Outlook, third parties who wanted to extend the Outlook user interface (UI) to include custom functionality were restricted by limited support for custom forms in Outlook. Often, when you wanted to add a few fields or make a small modification to the form, Outlook required you to redesign the entire form.

In Outlook 2007, form regions allow more ways to add UI to standard forms and simplify the process of designing custom UI. For example, through an adjoining form region, a developer can extend any existing form with additional fields or controls. These adjoining form regions are displayed at the bottom of the first page of a form, and each adjoining form region is collapsible. Developers can also add a separate form region, which is displayed as a full additional form page and can appear on any existing standard form or custom form. Another benefit of using form regions is that form regions support visual themes. In the past, developers were required to use custom Microsoft ActiveX controls or advanced workarounds to enable a themed look to custom forms. With form regions, all of the controls that come with Outlook 2007 inherit the Microsoft Windows theme.

Although popular development tools, such as Microsoft Visual Studio 2005, provide support for developing Office add-ins, these tools are missing some key components that are useful for writing Outlook 2007 COM add-ins in managed code, and in particular Outlook form regions. Although using Microsoft Visual Studio Tools for the Microsoft Office System (VSTO) would be the preferred development approach for writing Outlook form region controls, VSTO is currently incompatible with Office 2007 applications. In addition, these development tools do not have a comprehensive awareness of the interfaces and other points of contact between the forms hosting environment provided by Outlook and the controls written by developers. Therefore, developers must either write traditional ActiveX controls and forego the conveniences of the managed environment, or write newer managed controls and invest substantial extra effort to manually describe the interfaces needed to communicate with Outlook. The lack of understanding of the forms region architecture by popular development tools adds additional difficulty for the developer in all stages of the development process, including design, development, and debugging. These difficulties increase the amount of time spent by the developer overcoming hurdles of the environment and decrease the time available to the developer to spend on improving her component.

SUMMARY

A method and system for more easily developing managed controls for an email application (e.g., Microsoft Outlook) that supports ActiveX controls is provided, referred to as the forms hosting system. The forms hosting system allows a developer to design custom Outlook form regions containing standard and custom managed controls using popular development tools. The forms hosting system provides a runtime wrapper that appears to Outlook as a normal ActiveX control. When Outlook invokes the runtime wrapper control, the runtime wrapper control loads the managed controls defined by the developer. The runtime wrapper control translates messages received from Outlook into messages understood by the managed controls. Thus, the forms hosting system allows forms developed using newer forms technologies, such as WinForms, to be hosted in an environment designed for hosting older forms technologies, such as ActiveX.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system for more easily developing managed controls (e.g., form regions) for an email application (e.g., Microsoft Outlook) that supports ActiveX controls is provided, referred to as the forms hosting system. The forms hosting system allows a developer to design custom Outlook form regions containing standard and custom managed controls using popular development tools. The forms hosting system provides the developer with a development environment that has an intrinsic awareness of the form region design, development, and debugging process. Once the developer has created the form region, the forms hosting system provides a runtime environment for hosting the new form region as follows. When a user opens an item in Outlook that has a particular item type (e.g., an email message), Outlook queries the registry to identify add-ins that are registered for that item type and invokes any identified add-ins. The forms hosting system provides a runtime wrapper (HostX) that appears to Outlook as a normal add-in control (e.g., ActiveX control). When Outlook invokes the HostX control, the HostX control loads (e.g., binding the ActiveX control and the managed user control) a VSTO-provided Region Control that contains one or more managed controls. In some embodiments, when Outlook creates the form region it instantiates all of the controls. As a part of this process the HostX control may query the managed user control for required interfaces and set up internal smart pointers to them for later use. In some embodiments, the VSTO Region Control loads the managed controls. The HostX control translates messages received from Outlook into messages understood by the managed controls. For example, when a button is clicked in Outlook, such as the item close button, the HostX control sends a close event through the VSTO Region Control to the managed controls. Similarly, when a button is clicked on the form, the HostX control may receive a message to communicate to Outlook (e.g., an item send event). Thus, the forms hosting system allows forms developed using newer forms technologies, such as WinForms and Windows Presentation Foundation (WPF), to be hosted in an environment designed for hosting older forms technologies, such as ActiveX.

Overview

Each type of item that is displayed in Outlook is associated with a message class. For instance, an email item belongs to the IPM.Note message class, and a calendar item belongs to the IPM.Appointment message class. For each type of item, Outlook can display a user-defined control. This control is called a form region. There are three basic elements required to create a form region: an OFS file defining the control that is going to be displayed, an XML manifest describing the characteristics of the form region, and a registry entry that associates the manifest with a message class.

When Outlook is ready to display an item of a specific MessageClass type, it checks the HKCU\Software\Microsoft\Office\Outlook\FormRegions\ {MessageClass} registry key for any string values. The string values in this key are expected to be of the format "Form Region Name"="Form Region defining object." A Form Region defining object is the string description of an object that is or can provide a form region manifest (for instance, the full path to a manifest XML file). If Outlook finds a valid entry, it will query the Form Region defining object for the XML manifest and it will use the information contained in this manifest to create a form region. In the particular case of COM add-ins (including VSTO COM add-ins), the form region registry entry has a special format: "Form Region Name"="=ManagedOutlookAddInName". The '=' prefix tells Outlook that the object defining the form region is an add-in, such as a VSTO managed add-in. With that information, Outlook will query the ManagedOutlookAddInName add-in for an implementation of FormRegionStartup. The VSTO form hosting system provides the Microsoft.Office.Tools.Outlook.OutlookAddIn class, which inherits from Microsoft.Office.Tools.AddIn and adds a FormRegionStartup implementation in the form of the Microsoft.Office.Tools.Outlook.FormRegionManager class. A FormRegionManager instance is associated with every OutlookAddIn instance and loads a list of all available FormRegions in the current assembly.

ActiveX Control Wrapper

In some embodiments, the forms hosting system provides a runtime component (FormRegionsHostX or HostX) that translates between the interfaces exposed by Outlook and the interfaces expected by a WinForms-based form. The runtime component appears to Outlook as a standard ActiveX control. The runtime component interacts with the VSTO Form Region Control, which encapsulates other managed controls. The HostX control may create wrappers that duplicate the interfaces provided by Outlook to provide to controls so that the runtime component can more easily translate between the two layers. For example, each window in Outlook provides a site, document, and frame object. The site object describes the overall window, the frame describes the visual elements of the window (e.g., the border), and the document defines the underlying object providing the data for the window (e.g., an email message). After the FormRegionsHostX control is instantiated, Outlook calls the IOleObject::SetClientSite member function and passes the reference to the current ClientSite object which contains an embedded object (IOleObject).

The FormRegionsHostX control creates (using CreateInstance) a FormRegionsClientSite object that wraps the original ClientSite object received from Outlook. The FormRegionsHostX control then calls the corresponding hosted control method SetClientSite and passes the newly created form regions ClientSite wrapper to it. To provide an appropriate implementation of the Outlook frame, the FormRegionsClientSite instance can create a FormRegionsFrame object as a wrapper around the original Outlook frame. The FormRegionsFrame object references the original frame through a pointer. This may be done, for example, to override the default Outlook functionality of the frame method SetBorder.

In some embodiments, the FormRegionsHostX control implements the following ActiveX interfaces: IDispatch, IOleObject, IOleControl, IOleInPlaceObject, IOleInPlaceActiveObject, IViewObject, IViewObject2, IDisposable, IPersistStreamInit, IProvideClassInfo. Standard OLE control functionality of the FormRegionsHostX control is provided by the implementation of the IOleControl interface and in-place activation is provided using the IOleObject interface. FormRegionsHostX uses the IOleObject interface to provide basic functionality to and communicate with its container, IOIeInPlaceObject which manages the activation and deactivation of the FormRegionsHostX control, and IOIeInPlaceActiveObject which provides a direct channel of communication between an in-place FormRegionsHostX, the Outlook frame window, and the document. Whenever an ambient property is changed, the container notifies the control via its implementation of the IOIeControl interface member function OnAmbientPropertyChange. The FormRegionsHostX control supports on demand rendering of a view of the object via the IViewObject and IViewObject2 interfaces.

Those of ordinary skill in the art will recognize how these interfaces are used to implement the behavior of an ActiveX control. For example, when a user clicks within the user interface of the control, the ActiveX interfaces inform the control of the coordinates that the user clicked. The FormRegionsHostX control receives this information, translates the information, and passes the information to the managed user control. For example, the FormRegionsHostX control may use the COM-to-.NET interop functions provided by the CLR to invoke managed functions within the managed user control from unmanaged ActiveX interfaces within the FormRegionsHostX control.

In some embodiments, the FormRegionsHostX control of the forms hosting system has no internal values that need to persist between application sessions. The hosted, managed control persists any needed initialization values in source code or within data associated with the control so that the FormRegionsHostX control can remain generic and work with many controls. The Outlook form region container queries for persistence of the FormRegionsHostX control and implements the IPersistStreamInit interface. The FormRegionsHostX control is created new each time it is used, and does not need to be reinitialized from a persisted state. For this reason, the FormRegionHostx control implements the IPersistStreamInit interface and in particular the NewInit member function.

In some embodiments, the FormRegionsHostX control creates and passes to the managed control a reference to a FormRegionsClientSite COM object. The FormRegionsClientSite object wraps the client site object provided by Outlook. The FormRegionsClientSite object may create another wrapper FormRegionsFrame COM object that wraps the frame object provided by Outlook. These wrapper objects allow the FormRegionsHostX control to intercept messages sent by the managed control to Outlook and vice versa, so that the forms hosting system can perform any necessary translation of the messages.

Development Environment

The forms hosting system provides a development environment for designing, developing, and debugging new managed controls. The development environment provides a familiar UI and tools for developers that are similar to those used for development of other managed components. Thus, developers can build Outlook add-ins as easily as other types of managed components.

In some embodiments, the forms hosting system provides an item creation wizard to a control developer. Through the item creation wizard, a developer can easily make selections for the behavior and characteristics of the form region. For example, the item creation wizard may automatically create the background manifest XML file required to define a form region. Authoring the manifest file is an error-prone and sophisticated process that often results in errors when it is manually created. By providing a wizard to create the manifest file based on straightforward user choices, the wizard provides the developer with a less error-prone process for item creation.

In some embodiments, the forms hosting system provides a template for creating new Outlook form region add-ins. The template contains information that identifies the control as a specific control type for hosting in an Outlook form region. The template may contain default UI elements, such as buttons, text boxes, and so on. The template may also contain default message handling source code, such as a handler for responding to an event that loads or closes the managed control.

In some embodiments, the forms hosting system provides a properties window to a control developer. The properties window allows the developer to configure form region behaviors. The wizard or template provides initial values for these properties, and the properties window allows the developer to add additional behavior, such as code to run when a particular event is triggered.

In some embodiments, the forms hosting system automatically updates the registry when creating a new managed control. For example, the forms hosting system may make the necessary updates to registry settings expected by the email application, so that the email application will load the new control when a particular type of item is viewed using the email application. The forms hosting system may perform a deployment process during which the registry keys are populated. For example, each time a developer builds the control in the development environment, the development environment may deploy the managed user control and set it up for use on the developer's computer system.

FIGURES

The details of the system described above will now be illustrated with reference to the figures.

Figure 1:
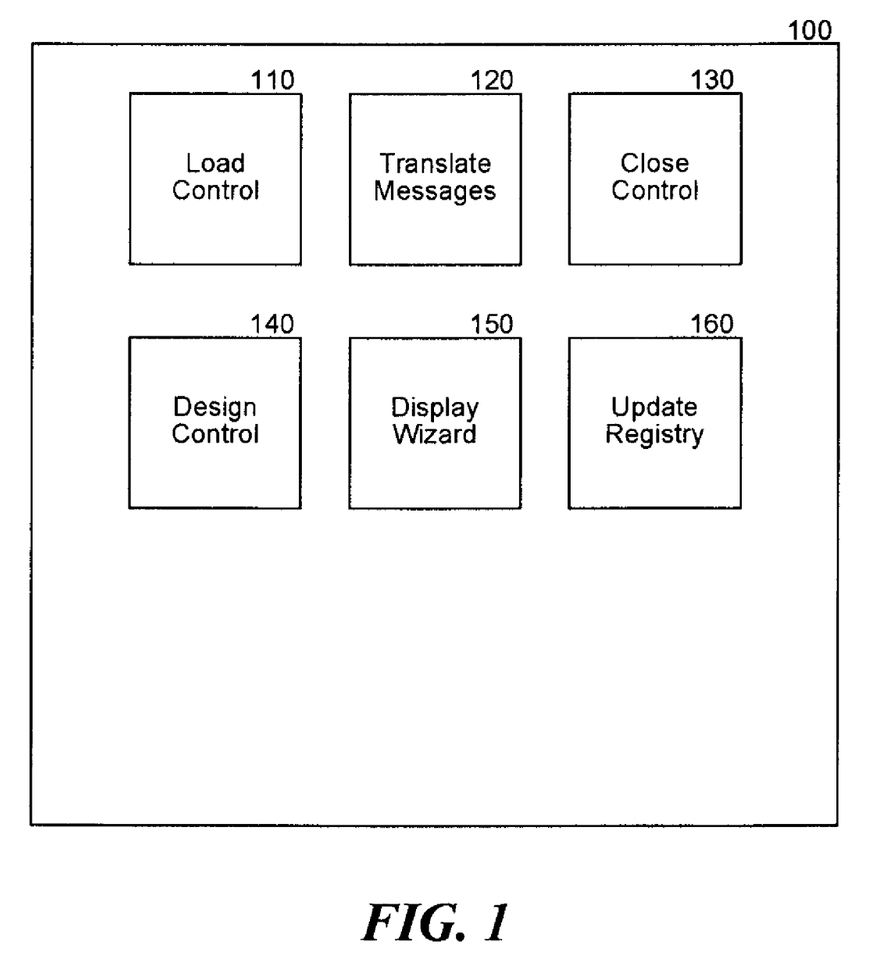
FIG. 1 is a block diagram that illustrates components of the forms hosting system in one embodiment.

FIG. 1 is a block diagram that illustrates components of the forms hosting system in one embodiment. The forms hosting system 100 contains a load control component 110, a translate messages component 120, a close control component 130, a design control component 140, a display wizard component 150, and an update registry component 160. The load control component 110 is used to invoke the runtime component of the system and the managed controls that it hosts. For example, Outlook may load the HostX control, which may then load the VSTO Region Control, which may load a set of embedded managed controls as described herein. The translate messages component 120 is used once the runtime component is loaded to provide communication between Outlook and the managed controls. For example, the translate messages component 120 may convert messages received through standard ActiveX control interfaces into messages expected by a WinForms-based control. The close control component 130 handles the shutdown of the runtime component. For example, when a user closes an item displaying a custom form, the close control component 130 handles the sequence of steps for closing the runtime component and the managed controls that it hosts.

The design control component 140 is used during development of a control to provide templates and other tools for the design and creation of new controls. The display wizard component 150 displays wizards to a developer that assist the developer in creating a new control. Using the wizards, the developer may specify details about the new control, and the wizards may then automatically perform one or more steps to carry out the developer's intentions. The update registry component 160 adds appropriate entries to the registry so that Outlook will load the new control when an item of the specified type is displayed.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
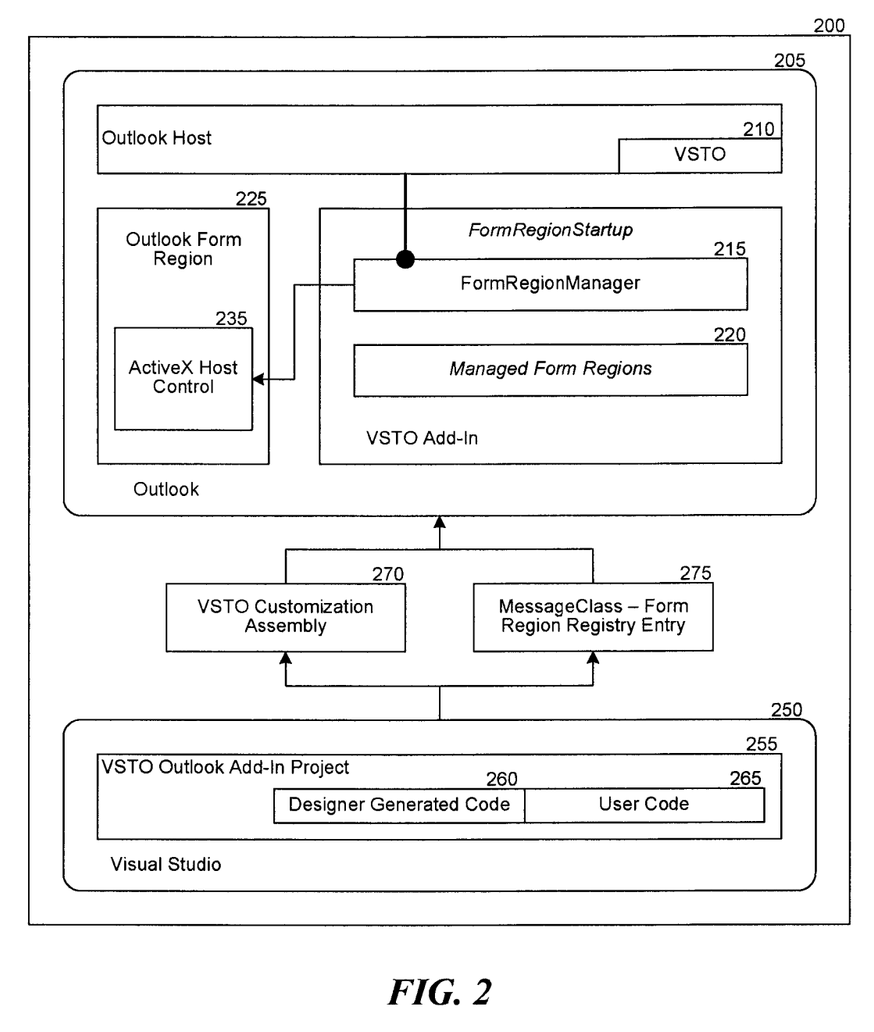
FIG. 2 is a block diagram illustrating the logical architecture of the forms hosting system in one embodiment.

FIG. 2 is a block diagram illustrating the logical architecture of the forms hosting system in one embodiment. The forms hosting system 200 contains runtime components 205 and development components 250. The runtime components 205 include a HostX ActiveX control 235 that appears to the Outlook Form Region 225 as a typical ActiveX control. The HostX control 235 communicates with a VSTO runtime component 210 that includes a Form Region Manager 215 that hosts one or more managed form regions 220. The development components 250 include a VSTO Outlook Add-In Project 255, designer generated code 260, and user code 265. The VSTO Outlook Add-In Project 255 may be created from a template and contains information for defining the control as an Outlook Add-In. The designer generated code 260 is code provided by the development components 250, such as through a wizard. The user code 265 is additional code added by the developer that defines the behavior of the new control. The development components 250 produce an assembly 270 containing all of the information needed by Outlook for loading and using the new control. The development components 250 may also add entries to the registry 275 used by Outlook to gather information about the control before loading it. In some embodiments, the runtime components 205 and development components 250 may include similar components and may only differ in that the runtime components 205 are reusable across multiple add-ins, whereas each add-in has its own set of development components 250.

Figure 3:
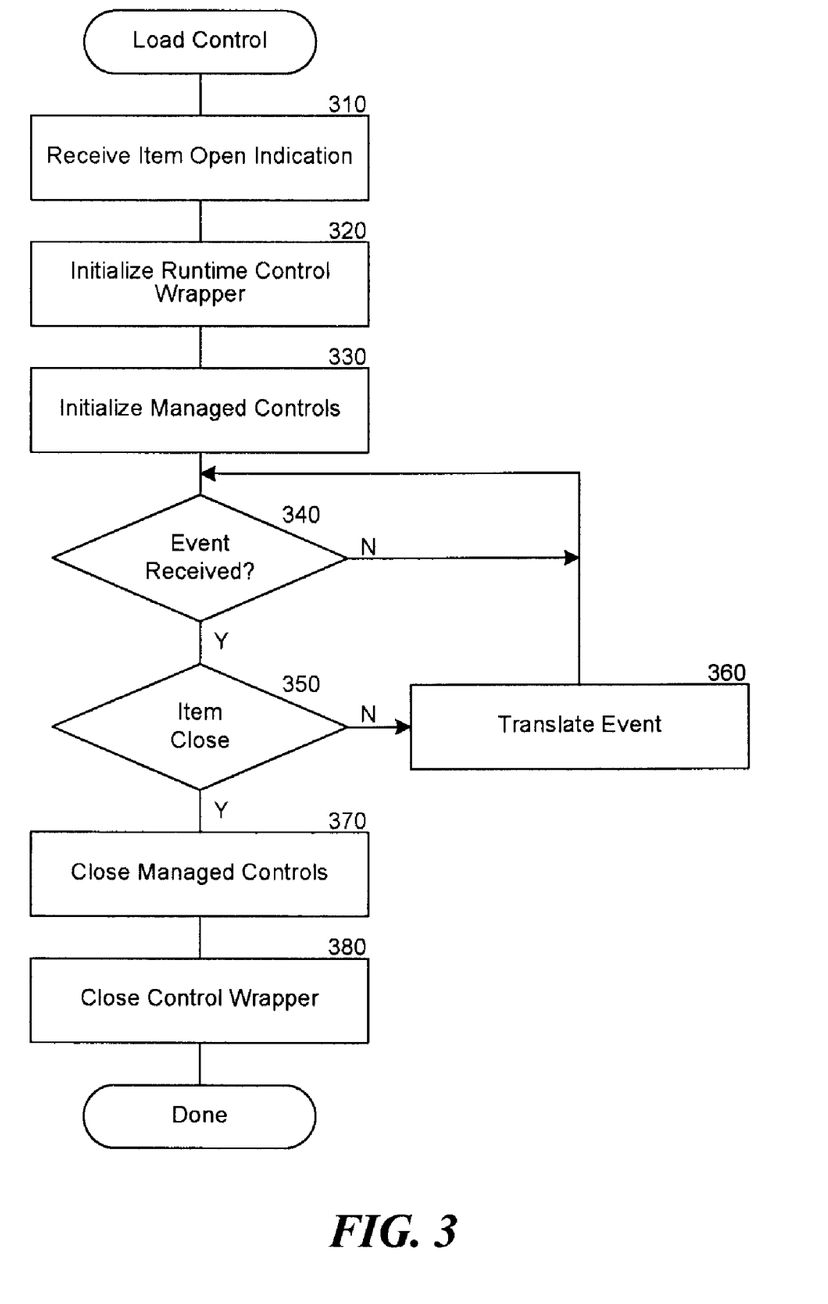
FIG. 3 is a flow diagram that illustrates the processing of the load control component of the forms hosting system in one embodiment.

FIG. 3 is a flow diagram that illustrates the processing of the load control component of the forms hosting system in one embodiment. The component is invoked when an item is opened that has a type for which a custom control is specified in the registry. In block 310, the component receives an indication that a user has opened a particular item that has a registered custom control. In block 320, the component initializes the runtime control wrapper (e.g., the HostX control). In block 330, the component initializes the managed controls hosted by the runtime control wrapper. For example, the component may initialize buttons, text boxes, and so on defined by the developer during development of the control. In decision block 340, when an event is received, then the component continues at block 350, else the component loops to block 340 to wait for an event. For example, for component may wait for a click from the user, or an indication from Outlook that something relevant has occurred, such as receiving a new message. In decision block 350, if the received event is an item close event indicating that the user has closed the item window, then the component continues at block 370, else the component continues at block 360. In block 360, the component translates the event into an event recognized by the managed controls, and then loops to block 340 to wait for the next event. In some cases, an event received from Outlook may not be relevant to the managed controls, and the component may simply disregard the event rather than translating it and passing it on. In block 370, the component closes the managed controls. In block 380, the component closes the runtime control wrapper. After block 380, the component completes.

Figure 4:
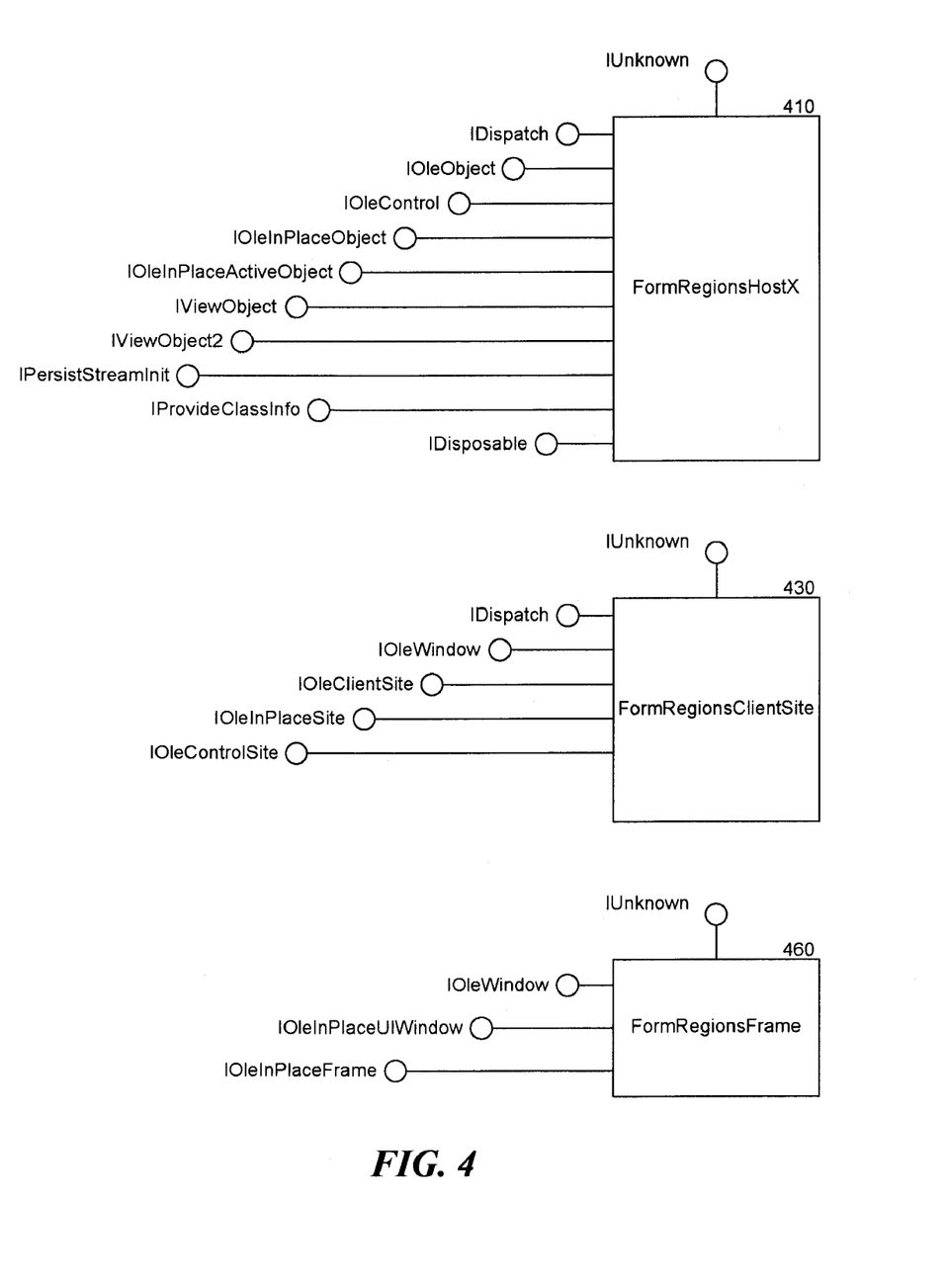
FIG. 4 is a block diagram that illustrates static COM classes including a wrapper COM object and additional site and frame objects used by the runtime control component in one embodiment.

FIG. 4 is a block diagram that illustrates static COM classes including a wrapper COM object and additional site and frame objects used by the runtime control component in one embodiment. The runtime control component contains the FormRegionsHostX control 410, the FormRegionsClientSite object 430, and the FormRegionsFrame object 460. Each of these objects interacts with similar objects provided by Outlook to wrap the communications going to and from Outlook so that the communications can be translated into communications expected by managed controls (e.g., a WinForms control). The FormRegionsHostX control 410 implements interfaces common to ActiveX controls such as IOIeObject, IOIeControl, IViewObject, and so on. The FormRegionsClientSite object 430 implements interfaces common to a ClientSite object, such as IOIeClientSite and IOIeControlSite. The FormRegionsFrame object implements interfaces common to ActiveX control-based window frames, such as IOIeWindow and IOIeInPlaceFrame. Using these objects, the forms hosting system translates messages from Outlook to an ActiveX control to messages expected by a managed control.

Figure 5:
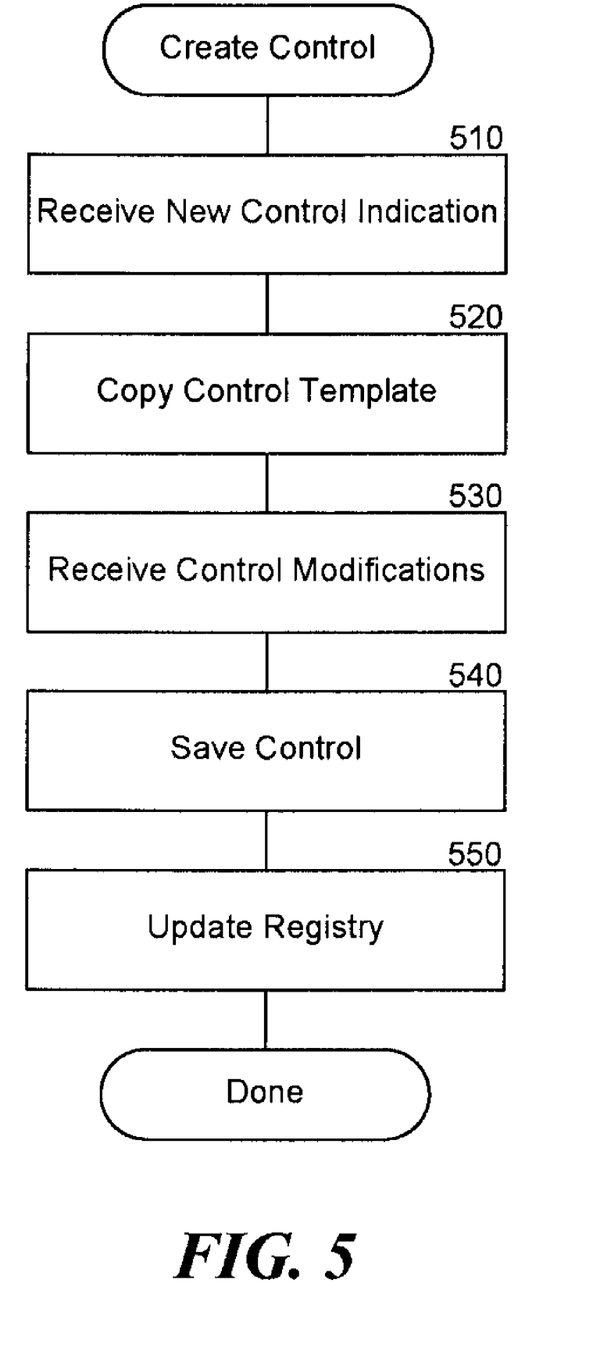
FIG. 5 is a flow diagram that illustrates the processing of the design control component of the forms hosting system in one embodiment.

FIG. 5 is a flow diagram that illustrates the processing of the design control component of the forms hosting system in one embodiment. The component is invoked when a developer creates a new Outlook Add-In control using the forms hosting system. In block 510, the component receives a new control indication that indicates that a developer wants to create a new control. For example, the component may be invoked by a wizard run by the developer for creating new controls. In block 520, the component copies initial information about the control from a control template. The control template may contain an initial set of controls such as buttons as well as default behavior, such as what actions to perform when the button is clicked. In block 530, the component receives modifications to the new control from the developer. For example, the developer may add additional child controls and may define new behavior through managed code to be run when a particular event occurs. In block 540, the component receives an indication that the developer has saved the control, and the component stores the control. For example, the component may pass the control to a build process that compiles the managed code and resources into an assembly. The component may also create a manifest file describing information about the new assembly. In block 550, the component updates the registry to specify information that Outlook will use to invoke the control when a particular type of item is opened. After block 550, the component completes.

CONCLUSION

From the foregoing, it will be appreciated that specific embodiments of the forms hosting system have been described herein for purposes of illustration, but that various modifications may be made without deviating from the spirit and scope of the invention. For example, although hosting techniques in Outlook have been described, other environments that use ActiveX controls could also use the techniques described herein for hosting managed controls. Accordingly, the invention is not limited except as by the appended claims.

We claim:

1. A method in a computer system for hosting a managed control in an email application designed for hosting unmanaged, ActiveX controls, the managed control being developed in a development environment, the method comprising:
   receiving an indication that an item has been opened in the email application with which the managed control is associated;
   after receiving the indication that an item has been opened, initializing a runtime wrapper that is an ActiveX control, wherein the runtime wrapper exposes interfaces and interfaces for the managed control; and
   under control of the initialized runtime wrapper,
      loading a management control of the development environment that in turn loads and hosts the managed control;
      receiving email events from the email application; and
      translating the email events received from the email application into events understood by the loaded managed control;
      providing the translated email events through the management control to the loaded managed control;
      receiving managed control events through the management control from the loaded managed control;
      translating the managed control events received the loaded managed control into events understood by the email application; and
      providing the translated managed control events to the email application,
   such that the runtime wrapper appears to the email application as an ActiveX control and to the managed control as a managed control host.

2. The method of claim 1 wherein the managed control is associated with the item via a registry entry.

3. The method of claim 1 wherein the managed control is written using a managed code framework.

4. The method of claim 1 wherein the managed control is associated with a message class.

5. The method of claim 1 wherein the runtime wrapper includes a wrapper object that wraps an object representing a window frame provided by the email application.

6. The method of claim 1 wherein the runtime wrapper includes a wrapper object that wraps client site representing an ActiveX IClientSite interface provided by the email application.

7. The method of claim 1 wherein translating events comprises intercepting messages sent from the email application using the runtime wrapper.

8. The method of claim 1 wherein the runtime wrapper is dynamically initialized using information associated with the managed control.

9. The method of claim 1 wherein the managed control adds additional fields to an existing form.

10. A computer system for hosting a managed control in an email application that hosts ActiveX controls, comprising:
    a memory storing computer-executable instructions of:
       a load control component configured to load an ActiveX control from a registry of available ActiveX controls, wherein the ActiveX control provides a wrapper for hosting the managed control;
       a load management control component that loads a management control of a development environment in which the managed control was developed, the management control for loading and hosting the managed control;
       a translate messages component configured to expose interfaces for acting as an ActiveX control to the load control component and configured to expose interfaces for hosting a managed control, wherein the translate messages component translates messages received from the ActiveX interfaces to the managed control interfaces and messages received from the managed control interfaces to the ActiveX interfaces;
       a component that receives messages from the managed control through the management control and sends messages to the managed control through the management control; and
       a close control component configured to shut down the ActiveX control and managed control; and
    a processor that executes the computer-executable instructions stored in the memory.

11. The system of claim 10 wherein the translate messages component is further configured to intercept messages sent from the email application using the wrapper for hosting the managed control.

12. The system of claim 10 wherein the load control component loads the ActiveX control based on a message class of an opened item.

13. The system of claim 10 wherein the managed control adds an additional form page to an existing form for displaying an item.

14. A computer-readable storage device storing computer-executable instructions for controlling a computer system to host a managed control in an email application designed for hosting unmanaged, ActiveX controls, the managed control being developed in a development environment, by a method comprising:
    initializing a runtime wrapper, wherein the runtime wrapper exposes interfaces for acting as an ActiveX control and interfaces for hosting the managed control; and
    under control of the initialized runtime wrapper,
       loading a management control of the development environment that in turn loads and hosts the managed control;
       receiving email events from the email application;
       translating the email events received from the email application into events understood by the loaded managed control;
       providing the translated email events through the management control to the loaded managed control;
       receiving managed control events through the management control from the loaded managed control;

translating the managed control events received by the loaded managed control into events understood by the email application; and providing the translated managed control events to the email application.

15. The computer-readable storage device of claim 14 wherein the managed control is associated with the item via a registry entry.

16. The computer-readable storage device of claim 14 wherein the managed control is written using a managed code framework.

17. The computer-readable storage device of claim 14 wherein the managed control is associated with a message class.

18. The computer-readable storage device of claim 14 wherein the runtime wrapper includes a wrapper object that wraps an object representing a window frame provided by the email application.

* * * * *